(No Model.)
M. F. MYERS.
POTATO PLANTER.
No. 525,918. Patented Sept. 11, 1894.
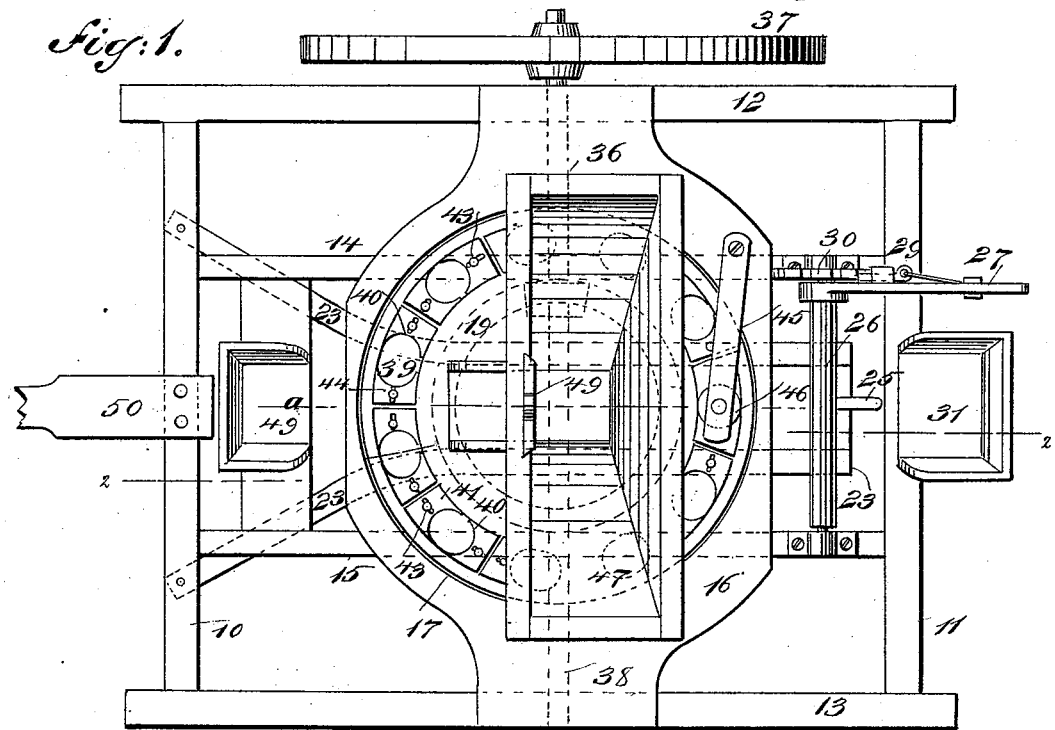
Fig. 1.
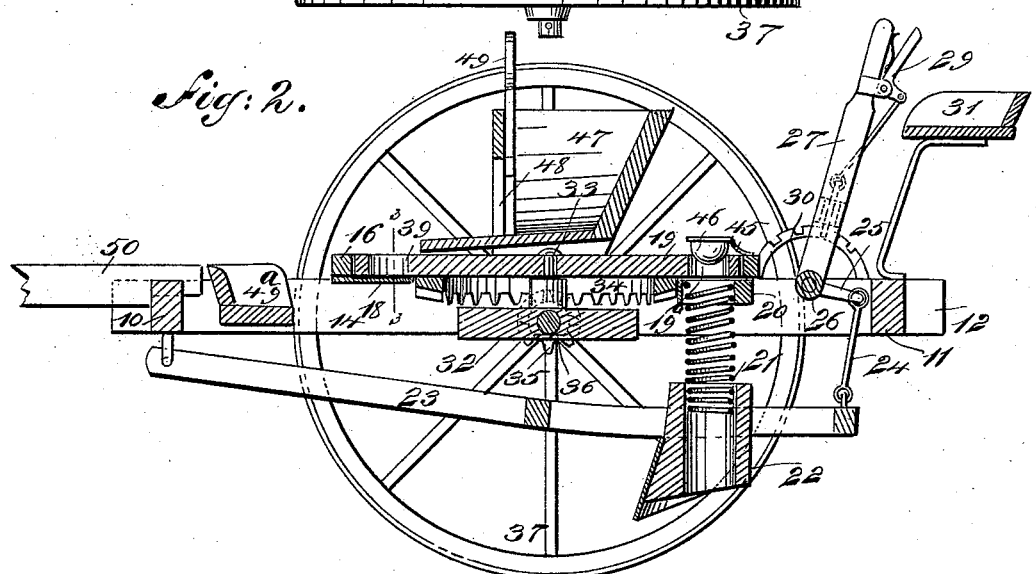
Fig. 2.
Fig. 3.
WITNESSES:
Chas. Nida
J. Fred Acker
INVENTOR
M. F. Myers
BY
Munn & Co
ATTORNEYS.

UNITED STATES PATENT OFFICE.

MILLARD F. MYERS, OF GREENVILLE, OHIO.

POTATO-PLANTER.

SPECIFICATION forming part of Letters Patent No. 525,918, dated September 11, 1894.

Application filed May 14, 1894. Serial No. 511,198. (No model.)

*To all whom it may concern:*

Be it known that I, MILLARD F. MYERS, of Greenville, in the county of Darke and State of Ohio, have invented a new and Improved Potato-Planter, of which the following is a full, clear, and exact description.

My invention relates to a potato planter, and it has for its object to construct such a machine in a simple and economic manner, and to provide for the reception of either large or small seed in the planting device, and furthermore to provide for the exit of seed from the device and its proper guidance into the hill into which the seed is to be deposited, the planting device consisting of a disk having suitable pockets into which the seed is placed.

The invention consists in the novel construction and combination of the several parts, as will be hereinafter fully set forth, and pointed out in the claims.

Reference is to be had to the accompanying drawings, forming a part of this specification, in which similar figures of reference indicate corresponding parts in all the views.

Figure 1 is a plan view of the machine. Fig. 2 is a central vertical section, taking essentially on the line 2—2 of Fig. 1; and Fig. 3 is a detail view taken through one of the pockets in the planting disk.

In carrying out the invention the frame of the machine usually consists of a front bar 10, a rear bar 11, outer side bars 12 and 13, serving to connect the front and rear bars, and longitudinal bars 14 and 15, extending from front to rear, one at each side of the center. A platform 16 is located at the central portion of the frame, extending across the beams thereof, and the platform is provided with a central circular opening 17 and a metal plate 18 secured upon its under face, which extends beyond the wall of the said opening 17 in a horizontal direction, forming virtually a seat for a planting disk 19, the said disk being held to freely turn in the opening 17. At the rear central portion of the platform 16, an opening is made therein, extending through from top to bottom, communicating with an opening 19ª made in a cross bar 20, located preferably between the longitudinal beams 14 and 15.

Within the opening 19ª of the cross bar 20 a tubular guide or throat 21 is secured in any suitable or approved manner, but the said tubular guide or throat need not necessarily extend upward within said opening, but may be attached to the cross bar around the lower edge of the opening. The tubular throat or guide is preferably made of spring wire, compactly coiled, and the lower end of the guide or throat is secured within a shoe 22, which shoe is attached to a frame 23 located beneath the main frame of the machine and pivotally attached to the front bar 10. The rear end of the swinging frame 23 is attached by means of a link 24 to a crank arm 25, attached to or forming a portion of a rock shaft 26, journaled at the rear of the platform 16 in suitable boxes located upon the longitudinal beams 14 and 15. The rock shaft 26 is rotated through the medium of a hand lever 27, provided with the usual thumb latch 29, adapted for engagement with a rack 30, secured upon the main frame of the machine. Thus by the manipulation of the rock shaft 26 the shoe 22 may be lowered as close to the ground as may be desired, placing the spring throat or guide under tension, and held in that position by the thumb latch and rack. When the thumb latch is released from the rack the spring throat or guide, in restoring itself to its normal position, will assist materially in raising the swinging frame 23 and the shoe 22. The driver's seat 31, is located at the rear of the main frame and convenient to the hand lever 27. Another platform 32 is securely attached to the under face of the frame, and in this platform the planting disk 19 is pivoted through the medium of a pivot pin 33. Upon the under face of the planting disk 19, a predetermined distance from its periphery, a gear 34, is securely fastened, and this gear is made to mesh with a pinion 35, fast upon a rotary section 36 of the axle of the machine. This rotary section of the axle is located preferably at the right-hand side of the machine, and the ground wheel 37 at that side is rigidly attached to the axle, or is made to move it through the medium of the usual ratchet and pawl; while at the left-hand side of the machine the second section 38 of the axle is located, this section being stationary, and the ground wheel 37 at this side is loosely mounted upon the fixed section of the axle.

The disk planter 19 is provided with a series of pockets 39, adapted to receive the seed, and these pockets are rendered large or small according to the size of the seed to be planted, by locating in each pocket a sectional sleeve 40, each section of the sleeve being provided with a flange 41, adapted to have sliding movement in a suitable recess 42 made in the upper face of the planting disk at each side of the pocket, as shown in Figs. 1 and 3, the adjustment being accomplished through the medium of set screws 43, or their equivalents.

In order that the seed shall be forced from the pockets when a pocket is brought over the aperture 19 in which the guide or throat 21 is located, a spring 45 is secured to the platform 16, preferably at its right-hand rear portion, which spring carries at its free end, said end extending over the disk, a head 46, preferably of a semi-circular character, and the spring 45 will force the head downward in whatever pocket that may be brought into registry with the throat or guide, forcing the seed therefrom, and when the disk rotates the head will ride upon the upper surface thereof between the pockets.

The potatoes to be planted are placed in a hopper 47, which is made to straddle the planting disk, and is secured to the platform 16. This hopper inclines to the central portion of its bottom, which portion is preferably straight or inclined upward, and the front central portion of the hopper is provided with an opening 48, which may be closed by a gate 49, and an attendant is stationed in a forward seat 49ª, located in front of the platform, which attendant will take the seed as required from the hopper, and place it in the pockets 39.

In this machine two operators are necessary, one to drive and manipulate the shoe and the other to place the seed; but the machine is so simple and economic in its construction that the requirement of two attendants is more than offset by the cost of the machine and the effective manner in which the work is accomplished. The tongue or pole 50 is usually secured to the front cross bar of the main frame.

In the operation of this machine, the seed as heretofore stated, is placed in the pockets, and as the machine is drawn forward the planting disk 19 is revolved, and as each pocket is brought over the guide or throat the head 46 of the spring feed 45 will compel the seed to leave the pocket and fall into the throat, from which the seed will pass to the shoe and then to the ground. The plate 18 serves to maintain the seed in the pockets until the throat is reached.

Having thus described my invention, I claim as new and desire to secure by Letters Patent—

1. The seed dropping disk having a series of seed apertures, and a vertically divided sleeve 40 in each opening and provided with slotted flanges 41 and screws passed through the flange slots into the upper side of the disk, the said sleeves being separate and independent of one another, substantially as described.

2. In a potato planter, the combination, with a frame, the axle and ground wheels, a circular guide carried by the frame, having an exit opening, and a planting disk held to horizontally rotate upon said guide and provided with a series of adjustable pockets, of a driving connection between the axle and the planting disk, a spring throat located beneath the exit opening in the guide, a frame pivoted to the main frame of the machine, a shoe carried by the said frame and connected with the said spring throat, a rock shaft provided with locking devices, connected with the supporting frame of the shoe, an exposed spring-controlled expelling head located over the exit opening in the guide and adapted to travel upon the upper face of the planting disk and enter the pockets as they register with the throat, and a hopper adapted to contain the seed and located over the planting disk having a closed bottom provided with a forward extension to deliver on the upper exposed side of the disk, and having a discharge opening in its front wall and a gate controlling the same, whereby the seed may be delivered upon the disk or removed from the hopper and placed in the pockets of the disk, substantially as shown and described.

MILLARD F. MYERS.

Witnesses:
J. S. WILLIAMS,
T. C. MILLER.